June 24, 1941.  H. M. WITHEROW  2,247,108
DEMAND METER
Filed Feb. 15, 1939
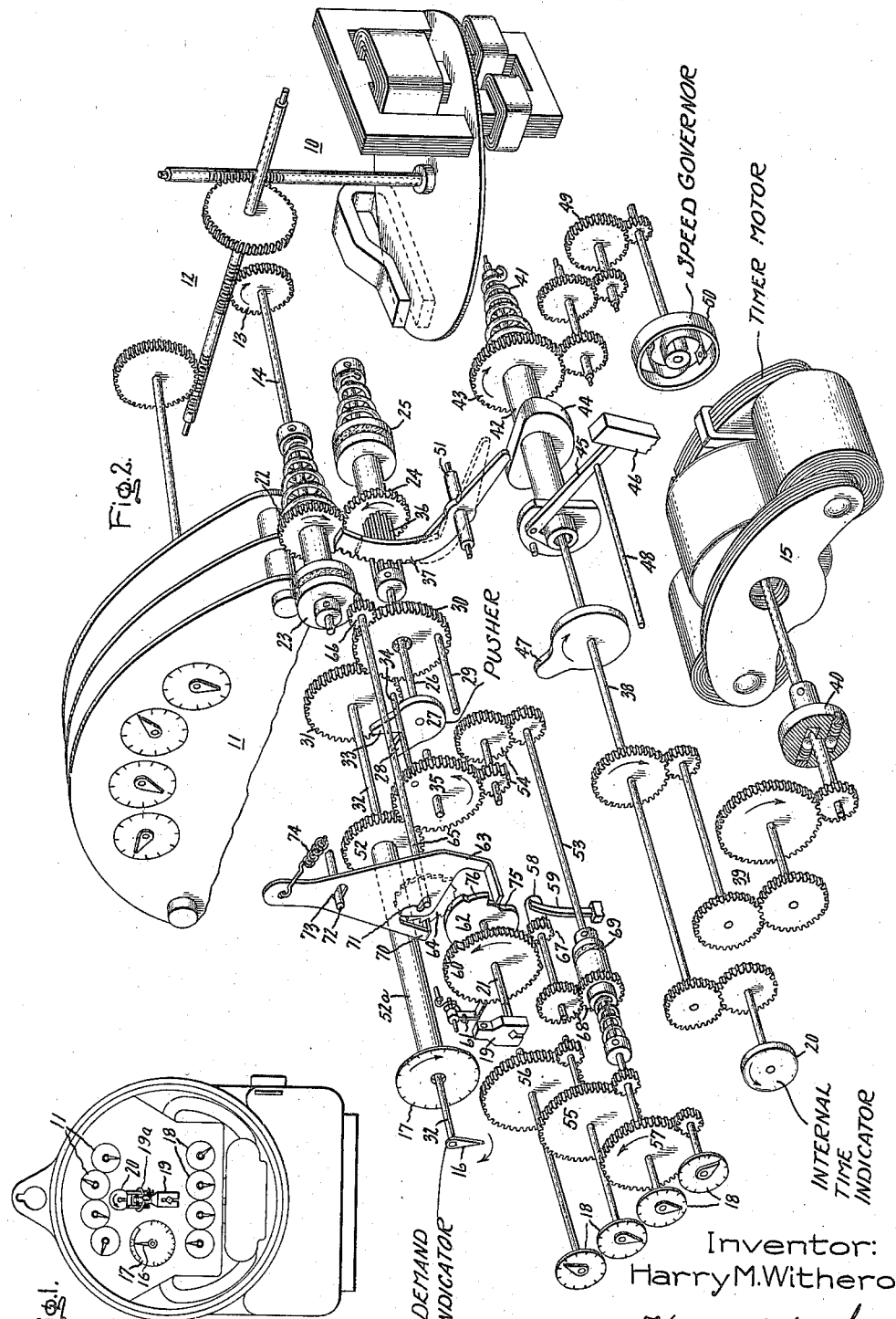
Inventor:
Harry M. Witherow,
by Harry E. Dunham
His Attorney.

Patented June 24, 1941

2,247,108

UNITED STATES PATENT OFFICE 2,247,108

DEMAND METER

Harry M. Witherow, Clifton, Mass., assignor to General Electric Company, a corporation of New York Application February 15, 1939, Serial No. 256,528

8 Claims. (Cl. 171—34)

My invention relates to demand meters and particularly to demand meters which permit the use of manual means for resetting the maximum demand indicator and by means of which the demand measurements are registered on an accumulative register.

Important objects of my invention are to simplify the maximum demand resetting mechanism and to provide high accuracy in the resetting operation even by unskilled persons. In carrying my invention into effect I do not attempt to reset the maximum demand measuring member backwards in a manual resetting operation, but instead I lock it in the measuring position where it is at the resetting time and establish a new zero point therefor. Another feature of my invention relates to a gear locking arrangement that relieves the gear train of strain when unlocked in order to avoid the gears from jumping forward and causing error when unlocked at the termination of a manual resetting operation.

The features of my invention which are believed to be novel and patentable will be pointed out in the claims appended hereto. For a better understanding of my invention reference is made in the following description to the accompanying drawing in which Fig. 2 shows an exploded perspective view of a demand meter mechanism in which my invention has been incorporated and Fig. 1 is a face view of such meter.

In the drawing, 10 represents a meter such as a watthour meter, the integrations of which are registered on a dial 11, the meter being connected in proper driving relation with register 11 through a gear train 12. The demand meter mechanism for registering the maximum amount of rotation of the meter 10 in a given period of time is driven from the meter through the worm gearing at 13 and the shaft 14. 15 represents a timing motor such as a self-starting synchronous motor used for establishing the time intervals over which the demand is measured. 16 is the maximum demand pointer which indicates with respect to a dial 17 the maximum demand measured over a large number of time intervals since the maximum demand mechanism was last reset. Ordinarily the time interval for demand measurement may be fifteen minutes or thirty minutes and the maximum demand indicator 16—17 is reset once per month. 18 represents a dial register on which the maximum demand measurements from month to month are accumulated. 19 is a manual reset lever which is turned at the end of each month by the authorized meter reader for resetting the maximum demand measuring mechanism and accumulating the measurements on dial 18. 20 is a time indicator which shows at all times the approximate time remaining in any demand measuring interval. The dials 11, 17 and 18 and the indicator 20 will ordinarily have their forward faces in the same, or approximately the same, plane towards the front or face of the meter where they may all be seen as represented in Fig. 1. The resetting lever 19 is mounted on the forward end of a shaft 21 which extends forward through or adjacent the glass cover of the meter, for example, as represented in Fig. 1 in such a way as to permit resetting of the maximum demand meter mechanism without removing the meter cover. In such cases, however, the resetting device will be arranged to be sealed or otherwise locked in its inactive position so that resetting can only be accomplished by the meter reader or other person authorized to do so and who has facilities for unlocking or unsealing and relocking or resealing the resetting device.

Having thus given a general description of the apparatus, I will now proceed to a more detailed description of those parts which comprise or which cooperate with the novel feature of the present invention.

As meter 10 rotates and drives gearing 12, gear 13 and shaft 14 leading to the demand measuring apparatus are rotated in a clockwise direction. Secured on shaft 14 and driven by said shaft through a slip friction clutch 23 is a gear 22 meshing with a gear 24. Gear 24 drives the pointer pusher shaft 26 through a slip friction clutch 25 in a counter-clockwise direction. On shaft 26 is a pusher 27 having a leading finger 28 which, when shaft 26 is rotated counter-clockwise by the meter, may engage and rotate a post 29 extending from a maximum demand measuring gear member 30 concentric with shaft 26 but having no driving connection therewith except through pusher parts 27, 28 and 29. Gear 30 meshes with and rotates a gear 31 on a shaft 32 to which the demand pointer 16 is secured. At the beginning of a maximum demand period, as will appear later, pusher parts 28 and 29 are in contact and hence during a demand interval pointer 16 will be rotated clockwise a distance proportional to the kilowatt hours measured by the meter 10 during such interval. If during any subsequent time interval pusher 27 is rotated farther, the maximum demand pointer 16 will be rotated farther and hence registers the maximum demand.

At the end of each demand interval, for example every 30 minutes, pusher shaft 26 and the pusher 27 carried thereby are rotated backward or clockwise to a zero position, which position is determined by trailing finger 33 of the pusher 27 coming in contact with a stop 34 projecting rearward from a normally stationary zero stop gear 35. Parts 27, 30 and 35 have the same axis of rotation and pins 29 and 34 project into the path of rotation of the fingers 28 and 33 of pusher 27.

The mechanism for returning pusher 27 to the zero position at the end of each demand interval comprises the interval timing mechanism operated by timing motor 15, and this mechanism operates to return pusher shaft 26 to a zero position through clutch 25, pinion 30, a rack lever 37 and a cam 44. Motor 15 runs continuously and drives a shaft 38 in a clockwise direction at one revolution per demand interval such as thirty minutes. This drive is through a suitable gear train 39 and a one way clutch 40. Clutch 40 is merely for the purpose of facilitating testing of the mechanism. It permits the gear train 39 to be advanced quickly by hand. The timing interval indicator 20 is also driven by shaft 38 and is arranged to make one complete revolution per timing interval, such as thirty minutes, and hence the position of the arrow thereon with respect to a reference point indicates approximately the number of minutes remaining in a timing interval and produces an indication which is useful both to the station operator and to the meter tester. Shaft 38 is secured to one end of a spring 41 coiled about shaft 38 and secured at its other end to a sleeve 42 through which shaft 38 passes. Sleeve 42 has secured to it a gear 43, a cam 44 and, pivotally secured to it, a stop finger 45. The stop finger 45 is arranged to strike against a stop plate 46 and normally prevent sleeve 42 and the parts carried thereby from rotating, and as a consequence spring 41 is wound up by the continuous rotation of shaft 38. However, shaft 38 has secured to it a releasing finger 47 which is arranged to strike a projection 48 extending from the finger 45 and move this stop finger off from stop plate 46. The sleeve 42 is thus released and it quickly makes one revolution under the tension of spring 41 and is stopped again in the position shown by finger 45 again coming into contact with stop plate 46. This happens once per demand interval. Gear 43 engages with a gear train 49 and drives a centrifugal brake device 50 which serves merely to prevent undesirable excessive speeds of sleeve 42 when it rotates. Cam 44 is in line with the path of movement of the near end of the rack lever 37 which is pivoted at 51. Hence, when cam 44 is rotated, if rack lever 37 is in a position to be contacted by the cam 44, it will be rotated counter-clockwise and in so doing will rotate gear 24 and pusher shaft 26 clockwise until finger 33 of pusher 27 comes against zero stop finger 34. If pusher 27 is returned against its zero stop before rack 37 has reached the limit of its travel when so moved by cam 44, clutch 25 will slip. The purpose of clutch 23 is to permit rotation of gear 24 in the time interval resetting operation.

The relative position of pusher 27, zero stop 34, and rack 37 as illustrated in full lines is an unusual but not an impossible one. Ordinarily when pusher 27 is in a zero position, as shown, rack lever 37 is in the position shown in dotted lines which is the position to which it is moved by the rotation of cam 44. Also, ordinarily the rack lever 37 will be moved from the dotted line position towards the full line position only as pusher 27 is moved away from its stop position by measurement of demand so that ordinarily there will be no occasion for clutch 25 to slip when a time interval resetting operation occurs. However, as will be explained hereinafter, zero stop 34 for pusher 27 is moved when, at the end of a month, for example, a meter reader resets maximum demand pointer 16 with respect to dial 17 and accumulates its reading on register 18. When this happens, stop finger 34 is moved up against pusher 27 with finger 28 of the pusher tight against pin 29 regardless of the rotative position of these parts and a new zero position of stop finger 34 is established. This temporarily changes the relative rotative positions of pusher 27 and rack 37 for a zero setting and on the next time interval resetting operation of the pusher 27 following a manual resetting of the maximum demand pointer 16, clutch 25 slips to bring about the necessary readjustment of pusher 27 and rack 37. The normal stationary position of cam 44 is that illustrated in the drawing and allows for the free movement of rack lever 37 over its complete range of movement between time interval resetting operations. The cam 44 rotates one revolution in a very short period of time, such as one second, at the end of each demand measuring time interval and when it so rotates, it moves the rack lever 37 back to a zero position (dotted line position) from any other position to which the lever might have been moved since the previous time interval resetting operation.

Once a month or at such other time interval as the regulations require, maximum demand pointer 16 is reset to a zero position with respect to scale 17. This is preferably done manually by the meter reader grasping lever 13 and turning it one complete revolution in a counter-clockwise direction. Actually what happens in the present mechanism, when this manual resetting operation is performed, is that pointer 16 stands still and dial 17 is rotated forward until its zero graduation is opposite pointer 16 and a new zero position for pointer 16 is thus established. It is seen that dial 17 is in driving relation with gear 35 on which zero stop 34 is mounted. This connection is through collar 52a and gear 52. Gears 52 and 35 may have the same diameter and number of teeth so that dial 17 rotates the same angular distance that zero stop 34 is rotated. These parts, however, rotate in opposite directions but only in one direction. That is, gear 35 only rotates counter-clockwise and dial 17 only rotates clockwise, which is the same direction in which maximum demand pointer 16 is rotated by meter 10 in the demand measurements.

Gear 35 is connected in driving relation with a shaft 53 through a gear train 54. Shaft 53 is also in driving relation with the maximum demand accumulative dial register 18. The unit pointer of this register is mounted directly on shaft 53. The tens and hundreds pointers of this register are driven from shaft 53 through the proper speed-reducing represented generally at 55 and 56. The tenths pointer is driven from shaft 53 through speed-increasing gears at 57. These gear ratios are preferably such that register 18 reads directly in the units measured, in this case kilowatts. Gear 67 has a hub 58 thereon against which a resilient brake member 59 bears. The brake member 58—59 makes it somewhat difficult for all parts connected in driving relation with shaft 53 to be rotated and serves to prevent accidental rotation of register 18, stop finger 34 and maximum demand dial 17 except manually by the application of appreciable force as will be described. Also, this brake holds gear 67 in the proper rotative position to mesh with gear 60 without locking action when these gears are brought into mesh.

The manual resetting of the dial 17 and zero stop 34 is accomplished by rotation of lever 19 and shaft 21 in a counter-clockwise direction. Shaft 21 has a mutilated gear 60 secured thereto. This gear is prevented from clockwise rotation by the stop pawl 61, and even over the mutilated portion of this gear it has short teeth so that pawl 61 will prevent clockwise rotation in any position of the gear. Shaft 21 also has a cam 62 secured thereto which cooperates with a cam follower 63 to perform a locking and unlocking action on a fine toothed ratchet wheel 64 connected by shaft 65 and pinion 66 to gear 30. For illustration purposes ratchet wheel 64 appears to have relatively few teeth but actually it will have a large number of fine teeth. The purpose of this locking arrangement is to prevent any undesirable motion of pusher pin 29 and the parts connected thereto during a manual resetting operation. The main toothed portion of gear 60 is adapted to mesh with a pinion 67 when this toothed portion is rotated past the pinion, but pinion 67 is not engaged by the short locking teeth in the mutilated gear. Pinion 67 is in driving relation with shaft 53 through gears 68 and a slip friction clutch 69. The normal stationary position of shaft 21 and the parts secured thereto are represented in the drawing. This is the position which these parts assume between manual resetting operations. Manual resetting is accomplished by rotation of shaft 21 one complete revolution in a counter-clockwise direction.

In the idle position of shaft 21 illustrated the mutilated portion of gear 60 is opposite pinion 67. Locking cam follower 63 rests on the lowest step 75 of cam 62 and in this position of the cam follower, ratchet wheel 64 is unlocked and gears 30, 31 are free to advance demand pointer 16 in accordance with the maximum demand measurement. The lever 19 is in position to be sealed as shown by seal 19a, Fig. 1. To manually reset, lever 19 or other resetting device is unsealed and is grasped and turned counter-clockwise. The first thing that happens on turning shaft 21 counter-clockwise about 30 degrees more or less, is that locking cam follower 63 is raised to the high part of cam 62. This moves the locking pawl 70 of the locking lever to the right into locking engagement with the teeth of ratchet wheel 64 and gear 30 and the parts connected thereto, including maximum demand pointer 16, are locked from rotational displacement in the position of the present maximum demand measurement. On further rotation of gear 60 counter-clockwise, its teeth engage with pinion 67 and then shaft 53 is rotated counter-clockwise and all the parts in driving relation with shaft 53 are rotated. If stop finger 34 is not already in contact with finger 33 of the pusher 27, it is first moved counter-clockwise into contact therewith. Then pusher 27 is forced around counterclockwise until its finger 28 comes up against stop finger 29, which is now locked from rotation by lock 64—70. Thus zero stop member 34 is advanced against maximum demand measuring member 29 with the pusher member intervening. At this time rotation of pusher 27 independently of gear 24 is permitted by slipping of clutch 25. When shaft 21 has thus been manually rotated far enough to bring finger 28 into contact with pin 29, it will be apparent that zero stop 34 has been advanced and with it maximum demand dial 17 exactly the distance corresponding to the just previous maximum demand measurement which was indicated by pointer 16 on dial 17, and also that this measurement has been added or accumulated on register 18. A new zero stop position of pin 34 has thus been established and dial 17 has been advanced so that its zero point is opposite pointer 16. Shaft 53 is now blocked from further rotation by the blocking action of pusher 27 between pins 34 and 29 and during the remainder of the rotation of the in-mesh relation of gear 60 with pinion 67, clutch 69 slips.

The gear ratio between gears 60 and 35 is such that the new zero position of stop pin 34 will be accurately established and shaft 53 blocked from further rotation by the time the gear 60 is rotated somewhat less than a complete revolution and is again demeshed from pinion 67. Gear 60 and pinion 67 are, however, demeshed before cam 62 and locking lever 63 operate to unlock ratchet wheel 64. Thus the locking action takes place before gear 60 and pinion 67 mesh at the beginning of this resetting operation but the unlocking action takes place after these gears are demeshed near the end of this resetting operation. Hence, there is and can be no unintentional movement of pin 29 and demand pointer 16 during this manual resetting operation and hence the maximum demand measurement is accurately transferred to the accumulated register 18. Lever 19 is again in sealing position and may now be sealed as indicated in Fig. 1. Very accurate reading of the maximum demand measurement is available by noting the difference in the readings of the register 18 before and after this manual resetting operation. As a matter of fact parts 16 and 17 are unnecessary but are desirable for testing purposes.

The locking cam 62 and the locking lever 63, cooperating with ratchet wheel 64, perform an additional function which is to relieve gears 30 and 31 of all torque strain at the time they are unlocked so as to avoid the tendency of these gears from jumping ahead when unlocked. It was explained that pusher 27 is brought up tight against post 29 in the manual resetting operation and is held there by reason of the fact that friction brake 58—59 prevents any backward movement of shaft 53 and parts connected thereto, when gears 60 and 67 are demeshed near the end of the manual resetting operation. Hence, there remains some slight strain in the train consisting of shaft 53, gears 54, gear 35, pusher 27, gears 30 and 66 and ratchet wheel 64 held by latch 70, which strain, if ratchet wheel 64 were suddenly unlocked, would tend to kick gear 30 forward in a counter-clockwise direction by an indefinite amount and cause a corresponding advance of pointer 16. The unlocking action of latch 70 on ratchet wheel 64 is so arranged as to relieve this strain before the ratchet wheel is actually unlocked and this action and the arrangement for its accomplishment will now be described.

It is noted that locking cam 63 is pivoted about two points, one point is the axis of ratchet wheel 64 where its shaft 65 extends through a slot 71 in the locking cam follower member 63. It is also pivoted about a pin 72 extending through a slot 73. A spring 74 urges the cam follower locking member 63 in a clockwise direction about these pivots, holding the cam follower against cam 62.

Cam 62 has two recessed step portions 75 and 76 of different radii. When the cam follower 63 is on the lowest step 75, ratchet wheel 64 is completely unlocked and shaft 65 is in the right hand end of slot 71 and pin 72 is in the left hand end of slot 73. This is the condition when lever 19 is in the upright normally stationary position which it assumes at the end of a manual resetting operation and is the condition illustrated in the drawing. When lever 19 is turned counter-clockwise the high part of cam 62 is moved under the cam follower 63, cam follower 63 is first moved about pivot 72 and latch 70 is moved radially into locking position until the left end of slot 71 strikes shaft 65 and then member 63 pivots about shaft 65 and moves to the left at the point where pin 72 passes through slot 73. The latter movement turns latch 70 (now in locking position) slightly about shaft 65 as a pivot in a counter-clockwise direction and this also turns ratchet wheel 65 in the same direction by a slight amount. The reverse movements occur in the unlocking action near the end of the manual resetting operation. When cam follower drops to step 76, the cam follower member 63 first rotates clockwise slightly about shaft 65 as a pivot allowing shaft 65 to turn a corresponding amount. This is sufficient to relieve the strain in the gear train and prevents gear 30 being kicked ahead by an indefinite amount when the cam follower drops onto the lowest step 75 of cam 62 in the final unlocking action of ratchet wheel 64.

I shall now review briefly the operation of the entire apparatus. Let it be assumed that the demand is measured over 30 minute intervals and the maximum demand reading is taken once per month at which time this reading is accumulated on register 13. Meter 10 runs at a rate determined by the rate of consumption of kilowatt hours in the circuit in which it is connected and the kilowatt hours are registered at 11. Motor 15 operates continuously at a speed such as to operate the timing interval mechanism every thirty minutes. Pusher 27 is advanced a distance proportional to the kilowatt hours measured in thirty minutes and is then reset to zero against stop pin 34. If, in any subsequent thirty minute interval there is a greater measurement pusher 27 will advance further and gear 30 and pointer 16 will be, of course, advanced and remain at the point of maximum demand over all of the thirty-minute intervals during a month. At the end of the month the meter reader visits the meter and first takes down the reading of the dials 11 and 18. He then unseals lever 19 and rotates it one revolution in a counter-clockwise direction, reseals the lever and takes down the new reading on dial 13. The difference of the two readings of dial 18 is the maximum demand measurement for the month. It is a measure of the advance of gear 30 during the month. This manual resetting operation is accompanied first by the locking of gear 30, then an advance of stop pin 34 counter-clockwise until pusher 27 is spaced between and against both pins 29 and 34 and also an advance of dial 17 clockwise until its zero point is opposite locked pointer 16. After this happens clutch 69 slips while the meter reader is turning lever 19 the remaining distance of one complete revolution to the position shown. Before this final position is reached the strain of the gear train of this mechanism is relieved and then gear 30 is unlocked. The meter reader may not turn lever 19 in the wrong direction because of pawl 61. He does not need to worry about readjusting the relative positions of rack lever 37 and pusher 27 as this will adjust itself when the timing interval mechanism functions the next time. The meter reader does not need to be careful about the rate at which he turns lever 19 because gear 35 comes against a definite stop and cannot overrun even on high speed resets. The accurate positioning of the zero stop 34 does not depend upon the skill or carefulness of the meter reader. He can neither increase nor decrease the previous or future demand meter readings by varying the speed at which the lever 19 is rotated. Hence, while it is feasible it is quite unnecessary to use a motor operated reset for the maximum demand measurement as in United States Patent 2,006,321.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. In a maximum demand meter, a pusher member, a maximum demand measuring member, and a zero stop member all rotatively mounted on the same axis of rotation, said last two members having parts in the path of rotation of the pusher member, means for rotatively advancing the pusher member away from the zero stop towards the maximum demand measuring member in accordance with a measurement, time interval mechanism for returning the pusher member against the zero stop at equal time intervals, the arrangement being such that the maximum demand measuring member is advanced by the pusher member in accordance with the maximum advance of the pusher member over a large number of time intervals, means for establishing a zero measurement condition of the maximum demand measuring means comprising means for, first, locking the maximum demand measuring member in its position of maximum advance, second, rotating the zero stop with the pusher member intervening up against the locked maximum demand measuring member to establish a new zero position of the zero stop member, and thereafter unlocking said maximum demand measuring member, and a dial register operated with the advance of said zero stop such that the difference of its readings before and after such advance of the zero stop member represents the extent of advance of said zero stop in terms of the maximum demand.

2. In a maximum demand meter, a pusher member, a maximum demand measuring member, and a zero stop all rotatively mounted on the same axis of rotation, said last two members having parts in the path of rotation of the pusher member, means for rotatively advancing the pusher member away from the zero stop towards the maximum demand measuring member in accordance with a measurement, time interval mechanism for returning the pusher member against the zero stop at equal time intervals, the time intervals being of such duration as compared to the maximum contemplated measurement advance of the pusher member that the latter is advanced less than a complete revolution per time interval, manually operated means which, when operated, first, locks the maximum demand measuring member in its position of maximum advance, second, advances the zero stop with the pusher member intervening against the locked maximum demand measuring member to establish a new zero position, and third, unlocks the maximum demand measuring member, a dial register operated with the manual advance of the zero stop such that the difference of the dial readings before and after such manual operation represents the extent of advance of the zero stop in terms of maximum demand, and a slip friction clutch through which the time interval mechanism operates to return said pusher member to zero position to permit of relative adjustment between the time interval mechanism and pusher member when the pusher is first returned to the new zero position.

3. In a maximum demand meter a maximum demand measuring member, a periodically reset pusher member for advancing the measuring member in accordance with the maximum demand as measured over a plurality of equal time intervals, a rotatively mounted stop member against which the pusher is reset at the end of each of such time intervals, a mutilated gear, a pinion adapted to engage with the toothed portion of said gear, a driving connection between said pinion and zero stop member including a slip friction clutch, resetting means for rotating said gear through a complete revolution in a direction to advance the zero stop member, means for preventing a reverse rotation of said gear, a cam also rotated with said gear by said resetting means, a locking device for the maximum demand measuring member operated by rotation of said cam, said resetting means, mutilated gear, and cam having normally stationary idle positions where the gear is out of mesh with said pinion and the demand measuring member is unlocked, and sealing means for preventing unauthorized operation of said resetting means when in its normally stationary idle position.

4. In a maximum demand meter, a maximum demand measuring member, a periodically reset pusher member for advancing the measuring member in accordance with the maximum demand as measured over a plurality of equal time intervals, a rotatively mounted stop against which said pusher member is reset at the end of each time interval, a mutilated gear, a pinion adapted to engage in driving relation with the toothed portion of said gear, a driving connection between said pinion and stop including a slip friction clutch, manual means for rotating said mutilated gear through a complete revolution in a direction to advance said stop, the driving connection between said gear and stop being such as to advance the stop against the demand measuring member with the pusher member intervening, said manual means and mutilated gear having a normally stationary idle position where the gear is out of mesh with the pinion, means for holding said stop against rotation except when advanced by said manual means, and locking and unlocking means for said maximum demand measuring member actuated by rotation of said manual means and effective to lock the measuring member against rotation during the advance of said stop.

5. In a maximum demand meter, a maximum demand measuring member, a periodically reset pusher member for advancing said measuring member in accordance with the maximum demand as measured over a plurality of equal time intervals, a rotatively mounted stop against which the pusher member is reset at the end of each time interval, a mutilated gear, a pinion adapted to engage in driving relation with the toothed portion of said gear, a dial register, a driving connection including a slip friction clutch between said pinion and said zero stop and dial register, manual means for rotating said gear through a complete revolution in a direction to advance said stop and dial register, the driving connection between said gear and stop being such as to advance the zero stop a distance not less than the maximum contemplated advance of said measuring member, said gear and manual means having a normally stationary idle position where said gear is out of mesh with said pinion, means for sealing said manual means in said stationary position, means for holding said stop and dial register against movement except when advanced by said manual means, and locking and unlocking means for said measuring member actuated by rotation of said manual means and effective to lock said measuring member when the mutilated gear and pinion are in mesh.

6. In a demand meter, a maximum demand measuring member, a periodically reset pusher for advancing said measuring member in accordance with the maximum demand as measured over a plurality of equal time intervals, a zero stop member against which the pusher is reset at the end of each time interval, said parts being rotatively mounted on the same axis of rotation, a shaft, a cam and a mutilated gear wheel secured to said shaft, manual means for turning said shaft, a pinion adapted to engage with the toothed portion of the mutilated gear, a driving connection between said pinion and zero stop including a slip friction clutch whereby rotation of said shaft through a complete revolution in a given direction causes said zero stop member to be advanced against the pusher and the pusher against the measuring member to establish a zero maximum demand measuring relation of the measuring member, pusher and zero stop, means for preventing reverse rotation of said zero stop, and means operated by said cam for locking the measuring member against rotation when the gear and pinion are in mesh and the zero stop is being advanced, whereby said clutch slips when the zero maximum demand measuring relation is established, said manual means having a normally stationary position where the gear and pinion are out of engagement and the measuring member is unlocked, said cam and locking member serving to lock the measuring member before and unlock it after the in-mesh relation of said gear and pinion during the complete revolution of said shaft, said locking means being pivoted to permit of slight reverse equal rotations of said measuring member when locked and at the time it is locked and unlocked to relieve rotary strain on the measuring member incident to the establishment of the zero demand measurement relation.

7. In a maximum demand meter, a maximum demand measuring member, a periodically reset pusher member for advancing said measuring member in accordance with the maximum demand as measured over a plurality of equal time intervals, a rotatively mounted zero stop against which the pusher member is reset at the end of each time interval, a gear train for advancing said zero stop against the pusher member and the pusher member against the measuring member to establish a zero measurement condition of said maximum demand measuring member, locking means for said measuring member comprising a toothed wheel in driving relation with said measuring member, a locking pawl movable to and from locking engagement with said wheel and also movable about the axis of rotation of said wheel and cam means for actuating said locking pawl, and manually operable means for operating both said cam and zero stop advancing means to perform their operations in the following sequence, locking the toothed wheel, rotating it slightly in one direction, advancing the zero stop to establish a zero measurement condition of the maximum demand measuring member, rotating the toothed wheel slightly in the opposite direction to relieve strain in said gear train, and, finally, unlocking said toothed wheel.

8. In a demand meter, a rotary toothed wheel, a rotary multiple step cam, a locking member having a locking pawl cooperating with said toothed wheel and a cam follower cooperating with said cam, said locking member having first and second pivots comprising stationary spaced pivot pins engaging correspondingly spaced slots in said locking member, a spring for biasing said locking member to unlocked position and against said cam, the second pivot being coaxial with the axis of rotation of said toothed wheel, the arrangement being such that rotation of said cam through a complete revolution, first, rotates the locking member about the second pivot to rotate said toothed wheel in one direction, second, rotates the locking member and toothed wheel in the opposite direction about the second pivot, and finally, rotates the locking member about the first pivot to unlocking position.

HARRY M. WITHEROW.